United States Patent
Calvi

(10) Patent No.: US 12,352,018 B1
(45) Date of Patent: Jul. 8, 2025

(54) WHOLE-HOME PRESSURE RELIEF SYSTEM

(71) Applicant: Dave Calvi, Lake Havasu City, AZ (US)

(72) Inventor: Dave Calvi, Lake Havasu City, AZ (US)

( * ) Notice: Subject to any disclaimer, the term of this patent is extended or adjusted under 35 U.S.C. 154(b) by 35 days.

(21) Appl. No.: 18/235,132

(22) Filed: Aug. 17, 2023

Related U.S. Application Data

(60) Provisional application No. 63/421,055, filed on Oct. 31, 2022.

(51) Int. Cl.
| | |
|---|---|
| *E03B 7/07* | (2006.01) |
| *F16K 17/04* | (2006.01) |
| *F16K 17/164* | (2006.01) |
| *F16K 17/168* | (2006.01) |
| *F16K 37/00* | (2006.01) |

(52) U.S. Cl.
CPC .............. *E03B 7/075* (2013.01); *E03B 7/071* (2013.01); *F16K 17/042* (2013.01); *F16K 17/164* (2013.01); *F16K 17/168* (2013.01); *F16K 37/0058* (2013.01)

(58) Field of Classification Search
CPC .... F16K 17/042; F16K 17/164; F16K 17/168; F16K 37/0058; E03B 7/075; E03B 7/071
See application file for complete search history.

(56) References Cited

U.S. PATENT DOCUMENTS

| | | | | |
|---|---|---|---|---|
| 2,886,058 | A * | 5/1959 | Horton ................... | F16K 15/063 137/542 |
| 3,160,317 | A * | 12/1964 | Hambro ................... | B01F 23/49 68/17 R |
| 6,915,813 | B2 * | 7/2005 | Kobes .................... | F16K 15/026 137/220 |
| 2013/0167952 | A1 * | 7/2013 | Mattson .............. | F16K 37/0008 137/551 |

* cited by examiner

*Primary Examiner* — Atif H Chaudry
(74) *Attorney, Agent, or Firm* — Plager Schack LLP; Mark H. Plager; Kara K. Verryt

(57) ABSTRACT

A whole-home pressure relief system for relieving pressure from a home's plumbing system may include a main body having an inlet end, an outlet end, and a hollow interior; inlet threads extending into an interior wall of the inlet end, the inlet end and inlet threads configured to removably engage with female threads on a conventional hose bib; a flow restrictor channel extending from a bottom end of the inlet end toward a central portion of the main body; a valve chamber within the interior of the main body, the valve chamber in fluid communication with the flow restrictor, wherein the valve chamber is configured to accept a pressure relief valve such that a valve inlet is in fluid communication with the flow restrictor; and outlet threads extending into an interior wall of the outlet end.

7 Claims, 4 Drawing Sheets

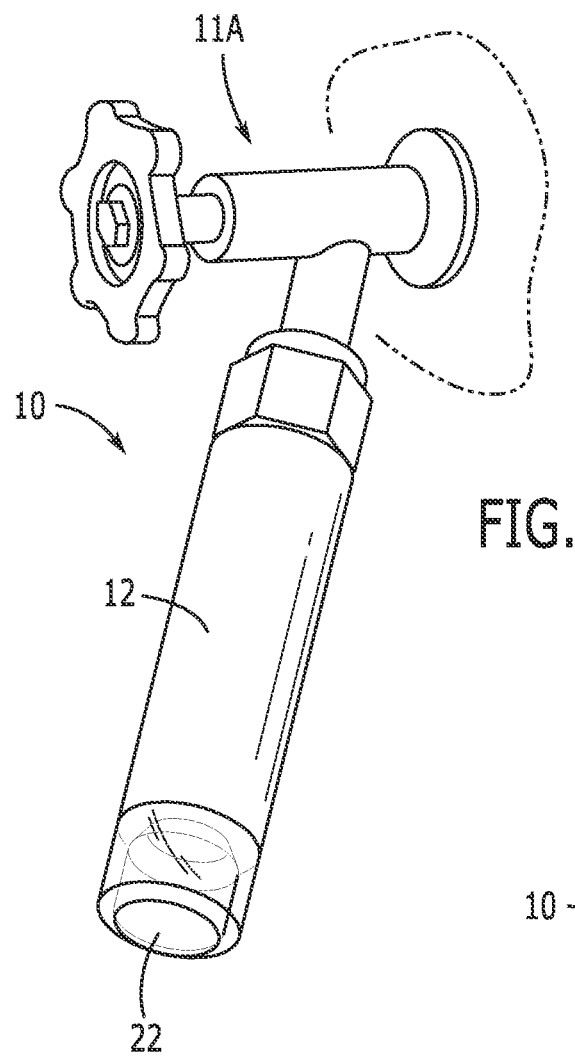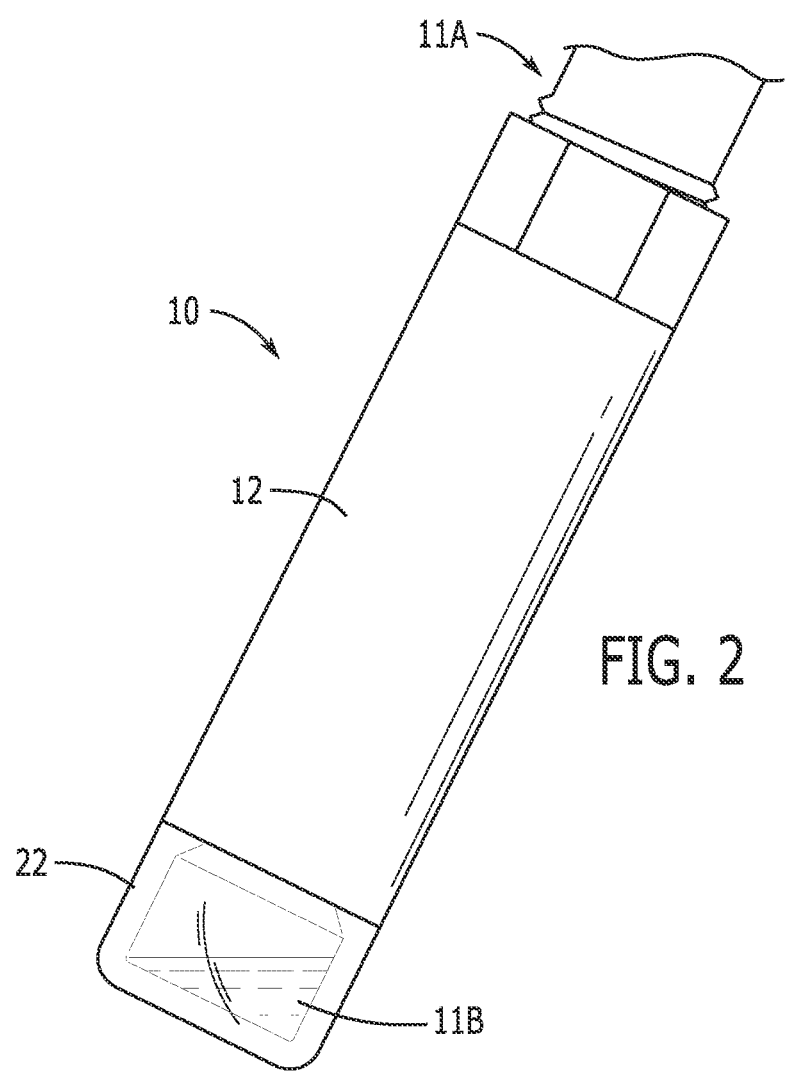
FIG. 1
FIG. 2

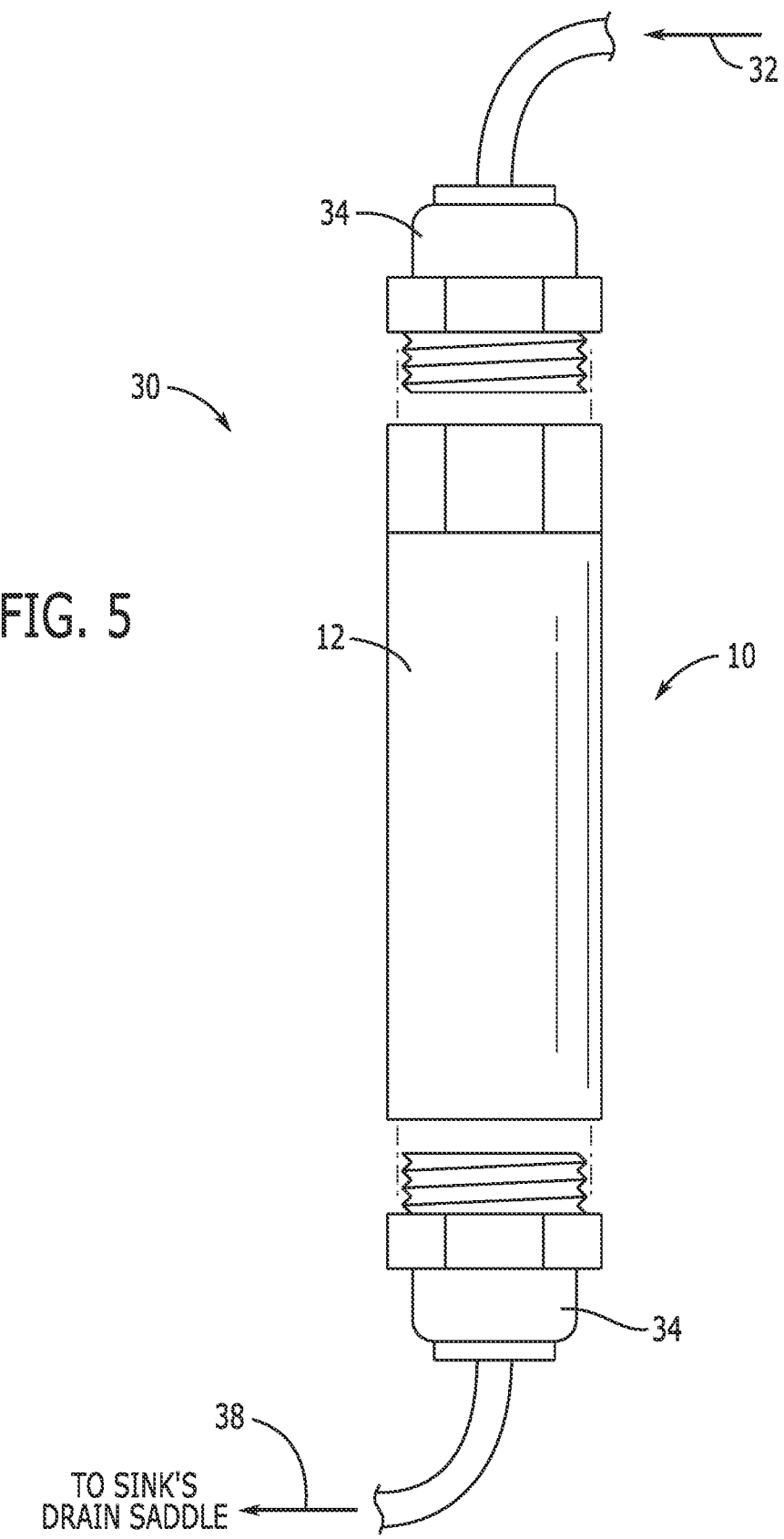

WHOLE-HOME PRESSURE RELIEF SYSTEM

RELATED APPLICATION

This application claims priority to provisional patent application U.S. Ser. No. 63/421,055 filed on Oct. 31, 2022, the entire contents of which is herein incorporated by reference.

BACKGROUND

The embodiments described herein relate generally to pressure relief systems and, more particularly, to a whole-home pressure relief system with a visual indicator of high water pressure that is easily connected to the home plumbing system.

A home can have high pressure even if it has a pressure-reducing valve positioned before the water enters the home. This can happen because the pressure reducing valves, over time, can stop holding the pressure back. An individual generally knows that their home has high water pressure only when something, such as a water heater, bursts, causing damage, flooding, and a need for a high-priced plumber to repair or replace an expensive appliance.

Conventional pressure relief valves use threads that do not allow the average homeowner to effectively implement them into their home's plumbing system. Moreover, existing pressure relief valves are not designed to be installed on an outside water outlet, nor do they relieve pressure before the water heater bursts.

Therefore, what is needed is an easily-installed whole-home pressure relief system to release pressure from the home's plumbing system by releasing a small amount of pressure, wherein the whole-home pressure relief system may be easily installed by the average homeowner on, for example, an existing connection point, such as an exterior hose bib.

SUMMARY

Some embodiments of the present disclosure include a whole-home pressure relief system for relieving pressure from a home's plumbing system. The whole-home pressure relief system of the present disclosure may include a main body having an inlet end, an outlet end, and a hollow interior; inlet threads extending into an interior wall of the inlet end, the inlet end and inlet threads configured to removably engage with female threads on a conventional hose bib; a flow restrictor channel extending from a bottom end of the inlet end toward a central portion of the main body; a valve chamber within the interior of the main body, the valve chamber in fluid communication with the flow restrictor, wherein the valve chamber is configured to accept a pressure relief valve such that a valve inlet is in fluid communication with the flow restrictor; and outlet threads extending into an interior wall of the outlet end.

BRIEF DESCRIPTION OF THE FIGURES

The detailed description of some embodiments of the invention is made below with reference to the accompanying figures, wherein like numerals represent corresponding parts of the figures.

FIG. 1 is a side perspective view of one embodiment of the present disclosure.

FIG. 2 is a detail side elevational view of one embodiment of the present disclosure.

FIG. 5 is an exploded side elevational view showing an optional connection method of one embodiment of the present disclosure.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a whole-home pressure relief system and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

Figure 3:
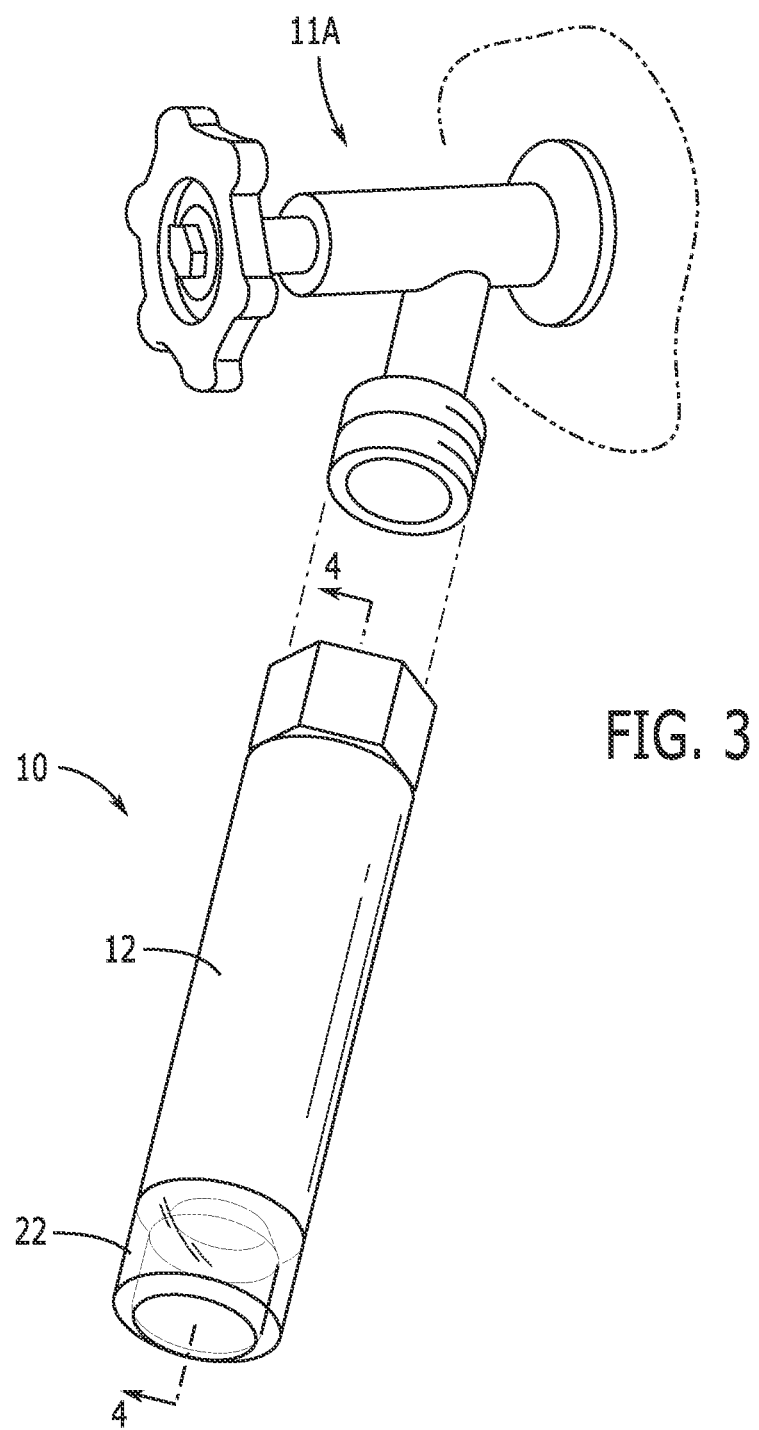
FIG. 3 is an exploded perspective view of one embodiment of the present disclosure.
Figure 4:
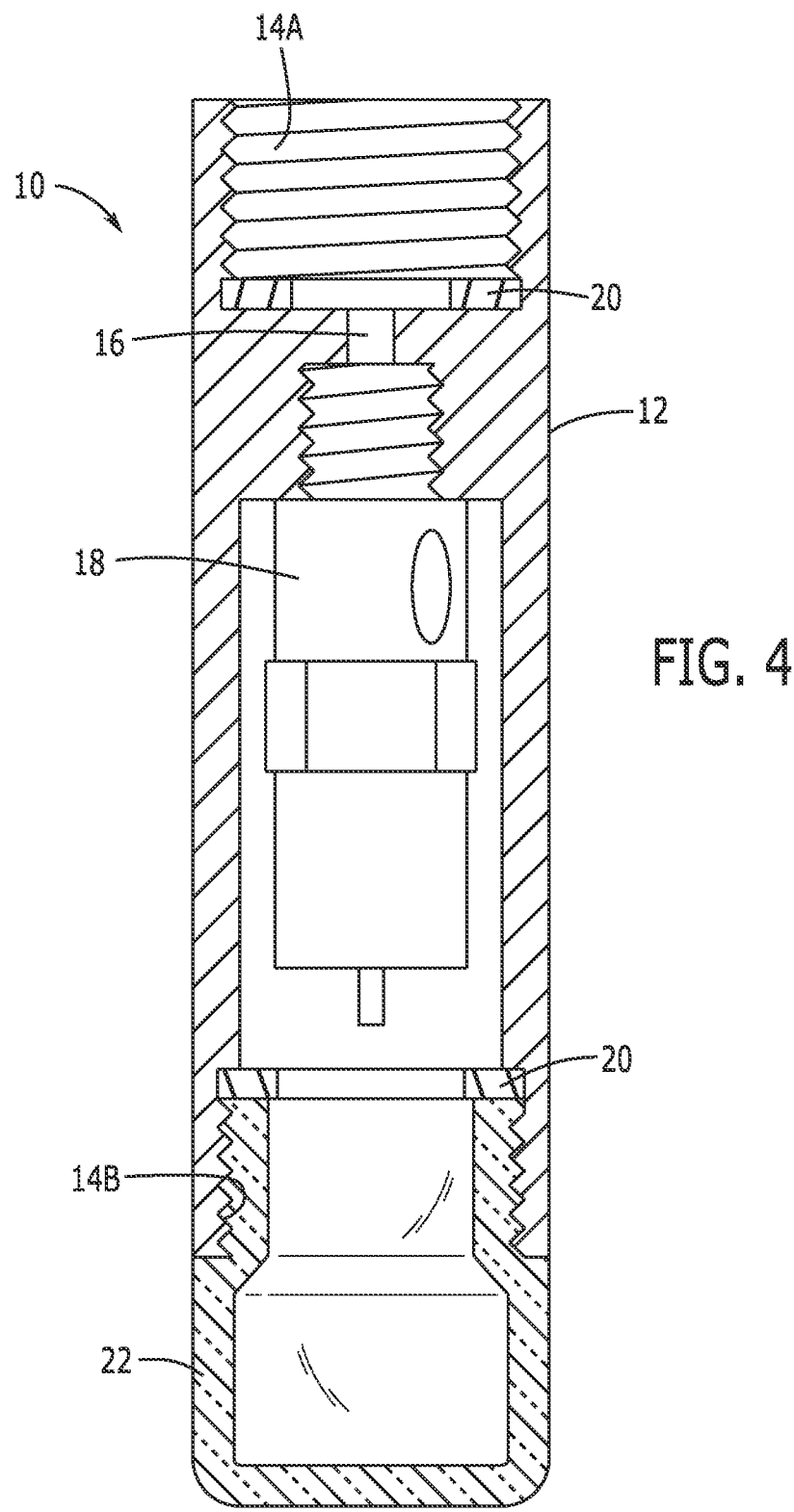
FIG. 4 is a cross-sectional view of one embodiment of the present disclosure, taken along line 4-4 in FIG. 3.

By way of example, and referring to FIGS. 1-5, some embodiments of the present disclosure include a whole-home pressure relief system 10 for relieving pressure from a home's plumbing system, the whole-home pressure relief system 10 comprising a main body 12 having an inlet end, an outlet end, and a hollow interior; inlet threads 14A extending into an interior wall of the inlet end, the inlet end and inlet threads 14A configured to removably engage with male threads on a conventional hose bib 11A; a flow restrictor channel 16 extending from a bottom end of the inlet end toward a central portion of the main body 12, wherein the flow restrictor channel 16 has a diameter smaller than a diameter of the inlet end; a washer 20 positioned within the bottom portion of the inlet end; a valve chamber within the interior of the main body 12, the valve chamber in fluid communication with the flow restrictor 16, wherein a pressure relief valve 18 is screwed into the valve chamber such that the valve inlet is in fluid communication with the flow restrictor 16; outlet threads 14B extending into an interior wall of the outlet end; and an outlet washer positioned between a bottom end of the pressure relief valve 18 and the outlet end of the main body 12. Some embodiments of the whole-home pressure relief system 12 may further comprise a sight cup 22 removably engaged with the outlet threads 14B on the outlet end, wherein the sight cup 22 may comprise a male threaded protrusion designed to removably engage with the outlet end. In embodiments, the sight cup 22 may be transparent for visualization of water-release by a user. Moreover, the sight cup 22 may include a small water release orifice extending therethrough, wherein the water release orifice allows for draining of the sight cup 22 when the sight cup 22 catches a predetermined volume of water. Alternatively or additionally, water release may also flow over the top of the sight cup 22 through the attachment threads due to the absence of a pressure seal at the top of the sight cup 22.

In embodiments, the whole-home pressure relief system 10 may be easily installed on an existing external hose bib 11A, as shown in FIG. 1. As such, the whole-home pressure relief system 10 may extend from the hose bib 11A at an angle, allowing for the buildup of excess water 11B within the sight cup 22 when a house or other structure has high pressure in the plumbing system. As mentioned above, when the excess water 11B level is too high within the sight cup 22, the excess water 11B may slowly drain from the sight cup 22 through a water release orifice or unsealed threads.

In some instances, such as that shown in FIG. 5, a user may wish to install the whole-home pressure relief system 10 on a different connection point, such as to an under-sink water supply 32. In such instances, the whole-home pressure relief system 10 may further comprise an adapter 34 designed to attach to the under-sink water supply 32 and to the inlet end of the main body 12. The adapter 34 may include a male threaded end designed to removably engage with the inlet end of the main body 12. This installation 30 of the whole-home pressure relief system 10 may be used without the sight cup 22, but rather with an outlet adapter 34, such as a thread-sealed outlet adapter, that includes a small hose that may be operatively attached to the sink's drain saddle, allowing excess water 38 to flow from the whole-home pressure relief system 10 through the outlet adapter 34 and to the drain saddle.

In yet further embodiments, a similar adapter 34 or a hose may be attached to the outlet end of the system 10 attached to a hose bib 11A, allowing for the transport of excess water to a desired location, such as to a garden bed or potted plant.

The components of the whole-house pressure relief system 10 of the present disclosure may be made of any suitable materials. For example, the pressure relief valve 18 may be any conventional pressure relief valve that fits within the main body 12. The sign cup 22 may be made of a transparent material, such as glass. The washer proximate to the outlet end of the main body 12 may be an extra thick garden hose washer.

To use the whole-house pressure relief system 10 of the present disclosure, a user would simply thread it onto an external hose bib 11A or, alternatively, attach the adapter 34 to the main body 12 and then operatively attach the adapter to the under the sink water supply 34. The hose bib 11A or faucet may then be turned on. When the home is operating at an acceptable pressure, no water will come out of outlet end of the main body 12. When water pressure exceeds a predetermined pressure, such as more than 75 psi, a trickle may come out of the outlet end. This amount is just enough to counteract the higher pressure coming in. When the sight cup 22 is installed, a user will be able to visually see the buildup of excess water 11B and know that there is a pressure issue within the plumbing system. Because the plumbing system in a house is a singular system, from the inlet after the pressure regulator, all the way to the furthest hose bib, releasing pressure at any one point relieves pressure instantaneously throughout the entire system and, as such, using the whole-home pressure relief system of the present disclosure may result in relieving pressure instantaneously through an entire home.

In some embodiments, the whole-house pressure relief system 10 may further comprise a threaded adaptor attached to the inlet end and the outlet end to allow for tubing to supply the inlet water and to drain the released water into a drain. This configuration may be particularly useful when used with reverse osmosis systems or in apartments or other similar buildings where hose bibbs are not available.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A whole-home pressure relief system for relieving pressure from a home's plumbing system, the whole-home pressure relief system comprising:
a main body having an inlet end, an outlet end, and a hollow interior;
inlet threads extending into an interior wall of the inlet end, the inlet end and inlet threads configured to removably engage with male threads on a conventional hose bib;
a flow restrictor channel extending from a bottom end of the inlet end toward a central portion of the main body, wherein the flow restrictor channel has a diameter smaller than a diameter of the inlet end;
a valve chamber within the interior of the main body, the valve chamber in fluid communication with the flow restrictor, wherein the valve chamber is configured to accept a pressure relief valve such that a valve inlet is in fluid communication with the flow restrictor;
a threaded channel extending between the flow restrictor channel and the valve chamber, wherein the threaded channel is configured to removably engage with a threaded end of the pressure relief valve;
outlet threads extending into an interior wall of the outlet end; and a sight cup attached to the outlet end, the sight cup being transparent and configured to provide for visualization of water exiting the outlet end.

2. The whole-home pressure relief system of claim 1, wherein the sight cup comprises a male threaded protrusion designed to removably engage with the outlet end.

3. The whole-home pressure relief system of claim 2, wherein the sight cup comprises a water release orifice extending through a surface thereof, wherein the water release orifice is configured to allow for draining of the sight cup when the sight cup contains a predetermined volume of water.

4. The whole-home pressure relief system of claim 2, wherein the sight cup comprises an unsealed site top and attachment threads configured to allow for the draining of the site cup.

5. The whole-home pressure relief system of claim 1, further comprising an outlet washer positioned between a bottom end of the pressure relief valve and the outlet end of the main body.

6. The whole-home pressure relief system of claim 1, further comprising an inlet adapter attached to the inlet end of the main body.

7. The whole-home pressure relief system of claim 1, further comprising an outlet adapter attached to the outlet end, the outlet adapter configured to removably engage with a hose.

* * * * *